Patented Jan. 18, 1927.

1,615,121

UNITED STATES PATENT OFFICE.

MARTIN ERNEST FYLEMAN, OF LONDON, ENGLAND.

PROCESS FOR SEPARATING MINERAL OILS OR THE LIKE FROM SAND OR ROCK.

No Drawing. Application filed November 16, 1920, Serial No. 424,465, and in Great Britain March 3, 1920.

The object of this invention is the separation of bitumen or mineral oil from rock or sand impregnated therewith, more especially from the so-called tar sands or oil sands such as are found in Alberta, Utah, and elsewhere.

The difficulty hitherto experienced in successfully separating the bitumen from such sands has militated against recovery of oil from the bitumen and useful application of the sand.

My method of separation consists in treating the sand with an aqueous solution of a non-acid substance which lowers the surface tension of water, namely, non-acid substances, which are capable of promoting the fromation of froth and alkali salts of alkaline reaction and alkali hydroxide.

The effect of such a solution on the rock or sand is to displace the bitumen or oil adhering to the mineral matter. Generally speaking, the bitumen or oil is not sufficiently fluid to be satisfactorily displaced unless the temperature is somewhat raised.

Thus, if the sand containing oil or bitumen is thoroughly stirred with a solution of the kind named, or if such a solution be caused to pass through the sand or rock, the bitumen or oil, if it is in a condition in which it can flow, will separate and rise to the surface of the solution or sink to the bottom thereof or become an emulsion therewith in accordance with its specific gravity or its nature. In any case the subsequent separation of the oil or bitumen from the solution and sand or rock is comparatively easy, resolving itself into a washing process of the kind commonly used for separating oil from water or from solids wetted with water.

When it is undesirable or impracticable to use heat as an aid to the fluidity of the oil or bitumen, the same end can be attained by adding to the sand or rock a small proportion of a solvent for the oil or bitumen, or a fluid miscible with the oil or bitumen but not with water; for instance by mixing or grinding the sand with such solvent either as a preliminary operation or simultaneously with the aqueous solution or by first causing the solvent to penetrate the rock.

Non-acid substances which lower the surface tension of water are not equally effective in the readiness with which they assist the separation of the oil or bitumen. Froth formers such as alkali soaps (including ammonium soaps), Turkey red oil, saponin or glue, are generally very effective; it is to be noted that bitumen frequently contains substances such as naphthenic acids which in presence of a soluble base constitute froth formers, so that in some cases the requisite froth former may be produced in situ; the effect of froth formers is equalled by that of alkali salts (including ammonium salts) of alkaline reaction including alkali hydroxides and carbonates and by alkali salts of organic or weak inorganic acids.

The aqueous solution may be very dilute; for example inferior glass freshly powdered and stirred with soft water will usually supply sufficient alkali silicate to serve for washing Alberta sand in accordance with this invention.

In practice the operation may be carried out with tar sand by heating it, with stirring, with water in which one of the above mentioned reagents such as an alkali soap or an alkali carbonate, hydroxide or silicate has been dissolved, only very small proportions of any of these compounds being necessary. On heating to 60 to 80° C. the tar is thus stripped from the sand and may then be separated from the latter by levigation or by other suitable means. Instead of heating, a suitable solvent may be added to dissolve the bitumen and the operation conducted in the cold in which case the oily solution of the bitumen separates from the sand and aqueous liquid and may be removed and distilled or otherwise treated as may be convenient.

The following examples illustrate the invention:—

(1) Fifty parts by weight of Alberta tar sand containing about 17.4 per cent of bitumen and about 80.7 per cent of mineral matter are heated to about 80° C. while stirring with a solution of 0.1 part by weight of sodium oleate (soap) in 100 parts by weight of water for a few minutes. The soap solution is then removed by decantation when the sand will be found to have separated more or less completely from the bitumen, and after this latter has been allowed to become semi-solid by cooling, the sand can be washed away in a stream of water. The operations may then be repeated twice, pouring back the same soap solution which was originally used. Very little sand then remains, 15 parts by weight of moist residue being left consisting of:—water 3 parts by weight or 20 per cent of the residue, bitumen 7.8 parts by weight or 52 per cent of the residue, mineral matter 4.2 parts by weight or 28 per cent of the residue.

Thus approximately 90 per cent of the mineral matter has been removed and 83 per cent of the bitumen recovered.

(2) Fifty parts by weight of the tar sand of the same quality as that described in example (1) are ground at room temperature with 18 parts by weight of ordinary paraffin oil (burning oil) and a solution of 0.1 part by weight of sodium oleate in 100 parts by weight of water. Practically the whole of the bitumen can thus be obtained in solution in the paraffin oil which rises to the surface leaving almost clean mineral matter below the surface of the water. The oily layer can then be separated and suitably treated.

(3) 2000 parts by weight of the tar sand of the same quality as that described in example (1) are heated to about 80° C. while stirring with a solution of 1 part of $Na_2CO_3$ in 1000 parts of water. The rest of the operation resembles that described in Example (1).

The solution of soap (sodium oleate) may be used repeatedy until adsorption and like sources of loss render it inoperative.

Having thus described the nature of the said invention and the best means I know of carrying the same into practical effect, I claim:—

1. A process of separating bitumen or mineral oil from sand or rock which consists in treating bitumen-bearing or oil-bearing sand or rock with an aqueous solution of a non-acid froth forming substance which lowers the surface tension of water.

2. A process of separating bitumen or mineral oil from sand or rock, which consists in treating bitumen-bearing or oil-bearing sand or rock with an aqueous solution of alkaline compound.

3. A process of separating bitumen or mineral oil from sand or rock, which consists in treating bitumen-bearing or oil-bearing sand or rock with an aqueous solution of a non-acid froth forming substance which lowers the surface tension of water at a temperature at which the oil or bitumen will flow easily.

4. A process of separating bitumen or mineral oil from sand or rock, which consists in treating bitumen-bearing or oil-bearing sand or rock with an aqueous solution of an alkaline compound at a temperature at which the oil or bitumen will flow easily.

5. A process of separating bitumen from oil sand or tar sand, which process consists in stirring the sand with an aqueous solution of a non-acid froth forming substance which lowers the surface tension of water at a temperature of about 80° C. and subsequently separating the bitumen from the mass by washing the latter in a stream of water.

6. A process of separating bitumen from oil sand or tar sand, which process consists in stirring the sand with an aqueous solution of an alkaline compound at a temperature of about 80° C. and subsequently separating the bitumen from the mass by washing the latter in a stream of water.

In testimony whereof I have signed my name to this specification.

MARTIN ERNEST FYLEMAN.